United States Patent [19]

Bachrach et al.

[11] Patent Number: 5,232,242
[45] Date of Patent: Aug. 3, 1993

[54] POWER CONSUMPTION LIMITING MEANS FOR AN ACTIVE SUSPENSION SYSTEM

[75] Inventors: Benjamin I. Bachrach, Dearborn; Michael B. Goran, Birmingham; James D. Grenda, Grosse Pointe; Joel A. Levitt, Ann Arbor; John E. Nametz, Ypsilanti, all of Mich.

[73] Assignee: Ford Motor Company, Dearborn, Mich.

[21] Appl. No.: 717,242

[22] Filed: Jun. 18, 1991

[51] Int. Cl.⁵ ............................................. B60G 17/015
[52] U.S. Cl. .................................................... 280/707
[58] Field of Search .................. 280/707; 364/424.05; 417/218, 221, 222

[56] References Cited

U.S. PATENT DOCUMENTS

| | | | |
|---|---|---|---|
| 3,575,442 | 4/1971 | Elliott | 280/707 |
| 3,884,496 | 5/1975 | Ito et al. | 280/707 |
| 4,034,564 | 7/1977 | Johnson et al. | 417/218 |
| 4,077,744 | 3/1978 | Pensa | 417/218 |
| 4,462,610 | 7/1984 | Saito et al. | 280/707 |
| 4,625,993 | 12/1986 | Williams et al. | 280/707 |
| 4,625,994 | 12/1986 | Tanaka et al. | 280/707 |
| 4,639,013 | 1/1987 | Williams et al. | 280/707 |
| 4,693,493 | 9/1987 | Ikemoto et al. | 280/707 |
| 4,775,481 | 10/1988 | Allington | 210/656 |
| 4,779,895 | 10/1988 | Rubel | 280/707 |
| 4,795,314 | 1/1989 | Pyrbella et al. | 417/43 |
| 4,807,128 | 2/1989 | Ikemoto et al. | 364/424.05 |
| 4,831,532 | 5/1989 | Kondo | 280/707 |
| 4,840,111 | 6/1989 | Garnjost | 91/436 |
| 4,848,790 | 7/1989 | Fukunaga et al. | 280/707 |
| 4,858,895 | 8/1989 | Buma et al. | 267/64.16 |
| 4,898,257 | 2/1990 | Brandstadter | 280/707 |
| 4,934,731 | 6/1990 | Hinatashi et al. | 280/707 |
| 4,973,079 | 11/1990 | Tsukamoto | 280/707 |
| 4,973,080 | 11/1990 | Ikemoto et al. | 280/707 |
| 5,004,265 | 4/1991 | Mizutani | 280/707 |
| 5,013,061 | 5/1991 | Fujimura et al. | 280/707 |
| 5,085,459 | 2/1992 | Sato et al. | 280/707 |

FOREIGN PATENT DOCUMENTS

| | | | |
|---|---|---|---|
| 251603A2 | 6/1987 | European Pat. Off. | |
| 0395114 | 10/1990 | European Pat. Off. | 280/707 |
| 0208213 | 8/1989 | Japan | 280/707 |
| 0290708 | 11/1990 | Japan | 280/707 |

Primary Examiner—Robert J. Oberleitner
Assistant Examiner—Tamara L. Graysay
Attorney, Agent, or Firm—Raymond L. Coppiellie; Roger L. May

[57] ABSTRACT

An active suspension system for a vehicle having sprung and unsprung masses including a powered source of pressurized fluid coupled to a processor. The processor calculates the rate of change of the power being consumed by the source and controls that rate of change whenever the calculated rate exceeds a predetermined value.

18 Claims, 4 Drawing Sheets

POWER CONSUMPTION LIMITING MEANS FOR AN ACTIVE SUSPENSION SYSTEM

BACKGROUND OF THE INVENTION

The present invention relates to actively controlled suspension systems and in particular to processor based active suspension systems which control the power consumed by the suspension system.

Active suspension systems are known to those skilled in the art. In general, active suspension systems control a vehicle's "ride" and "handling". Active suspension systems control and maintain the vehicle's attitude, for example, elevation, roll and pitch. Suspension systems of this type sense the attitude of the car and, in response, provide fluid power to, or remove fluid power from, actuators to maintain and control the "ride" and "handling" of the vehicle. For example, Williams et al, U.S. Pat. No. 4,625,993, teaches a conventional active suspension system intended to maintain a vehicle substantially stable in all planes of movement irrespective of any external forces acting upon the vehicle.

In general, active suspension systems, for example in automobiles and the like, include a source of pressurized fluid. The fluid source, for example a hydraulic pump, provides fluid power in the form of a pressurized working fluid to suspension units, one at each vehicle wheel. The pressurized fluid source is typically driven by torque provided by the vehicle's engine.

The fluid power provided by the pump is critical to the performance of the active suspension system because ability to provide sufficient fluid power to dissipate and/or counteract undesirable external forces. The power demand upon the pump is therefore a function of the power requirements of the suspension units which are largely a function of the vehicle speed and the conditions of the road including its "texture". As the conditions at each suspension unit change, the fluid power demanded and consumed by each suspension unit changes.

The pump's ability to meet the suspension unit's power demand, however, impacts the overall performance characteristics of the vehicle. That is to say, the load imposed upon the engine by the suspension system's pump has a bearing on the performance and response of the vehicle. If the suspension system's pump rapidly reduces its load demand on the engine, then the vehicle may experience undesirable surge. If the suspension system's pump excessively or rapidly loads the engine, then the vehicle may experience undesirable hesitation. The rate at which power is being provided to the pump at any given time is dependent upon the current vehicle conditions, including, for example, the engine speed, the throttle position, the transmission gear position, the spark advance, and the vehicle velocity..

Active suspension systems, like the system disclosed in Fukunaga et al, U.S. Pat. No. 4,848,790, adjust the pump's power consumption based primarily upon the speed of the vehicle. The pressure of the working fluid provided to the suspension units by the pump is dependent upon the speed of the vehicle. When the speed of the vehicle is below a reference value the suspension system provides fluid communication between a first pump and the hydraulic cylinders. The first pump provides fluid at a first fluid pressure. When the speed of the vehicle is above the reference value, the system provides fluid communication between a second pump and the hydraulic cylinders. The second pump provides fluid at a second fluid pressure where the second pressure is greater than the first.

Fukunaga et al type suspension systems focus upon the pump's unnecessary power consumption and the resulting degradation of fuel economy and drivability of the vehicle including the ability of the vehicle to accelerate on demand. Active suspension systems of this type vary the power consumption by the pump in an effort to limit unnecessary power consumption and reduce degradation of fuel economy and drivability.

The Fukunaga et al type suspension systems, however, are neither concerned with nor address the effects of the rate of change of the pump power demand and/or consumption on the vehicle's performance. These systems do not monitor and control the rate of change of the pump's power demand and consumption.

There exists a need for an active suspension system that monitors the rate of change of the power demand and/or consumption by the system's pump and controls the rate of change when the rate of change of power demand or consumption exceeds a predetermined level which is dependent upon the current conditions of the vehicle. Further, there exists a need for a system that controls the rate of change of the pump's power demand and/or consumption to reduce the impact on the vehicle's performance characteristics and reduce undesirable hesitation and/or surge.

SUMMARY OF THE INVENTION

In a principle aspect, the present invention is an active suspension system for a vehicle having sprung and unsprung masses, including fluid providing means and processing means. The fluid providing means provides a pressurized fluid. The processing means, which is coupled to the fluid providing means, calculates the rate of change of the power consumption by the fluid providing means and controls the rate of the change of the power consumption by the fluid providing means when the rate of change of the power consumption by the fluid providing means exceeds a predetermined value.

In another principle aspect, the processing means calculates the rate of change of the power demand of the fluid providing means and controls the rate of the change of the power demand of the fluid providing means when the rate of change of the power demand of the fluid providing means exceeds a predetermined value.

In another principle aspect, the present invention is an active suspension system for a vehicle having sprung and unsprung masses, including fluid providing means, at least one force exerting unit and processing means. The fluid providing means includes a fluid output port for providing a pressurized fluid. The force exerting units generates variable forces and includes a cylinder and a force exerting means. The cylinder is disposed between the vehicle body and the vehicle wheel and includes a pressure chamber adapted to receive the fluid from the fluid providing means. The force exerting unit further includes a force exerting means for varying the pressure of the fluid within the pressure chamber to generate variable forces. The force exerting means is fluidicly coupled to the cylinder and the fluid output port of the fluid providing means.

The processing means according to this aspect of the invention includes a processing unit, electrically coupled to the fluid providing means and the force exerting means, including power consumption limiting means, coupled to the fluid providing means, for controlling the rate of change of power consumption by the fluid providing means when rate of change of power consumption by the fluid providing means exceeds a predetermined value.

BRIEF DESCRIPTION OF THE DRAWINGS

In the course of the detailed description of preferred embodiments to follow, reference will be made to the attached drawings, in which.

DESCRIPTION OF PREFERRED EMBODIMENTS

Figure 1:
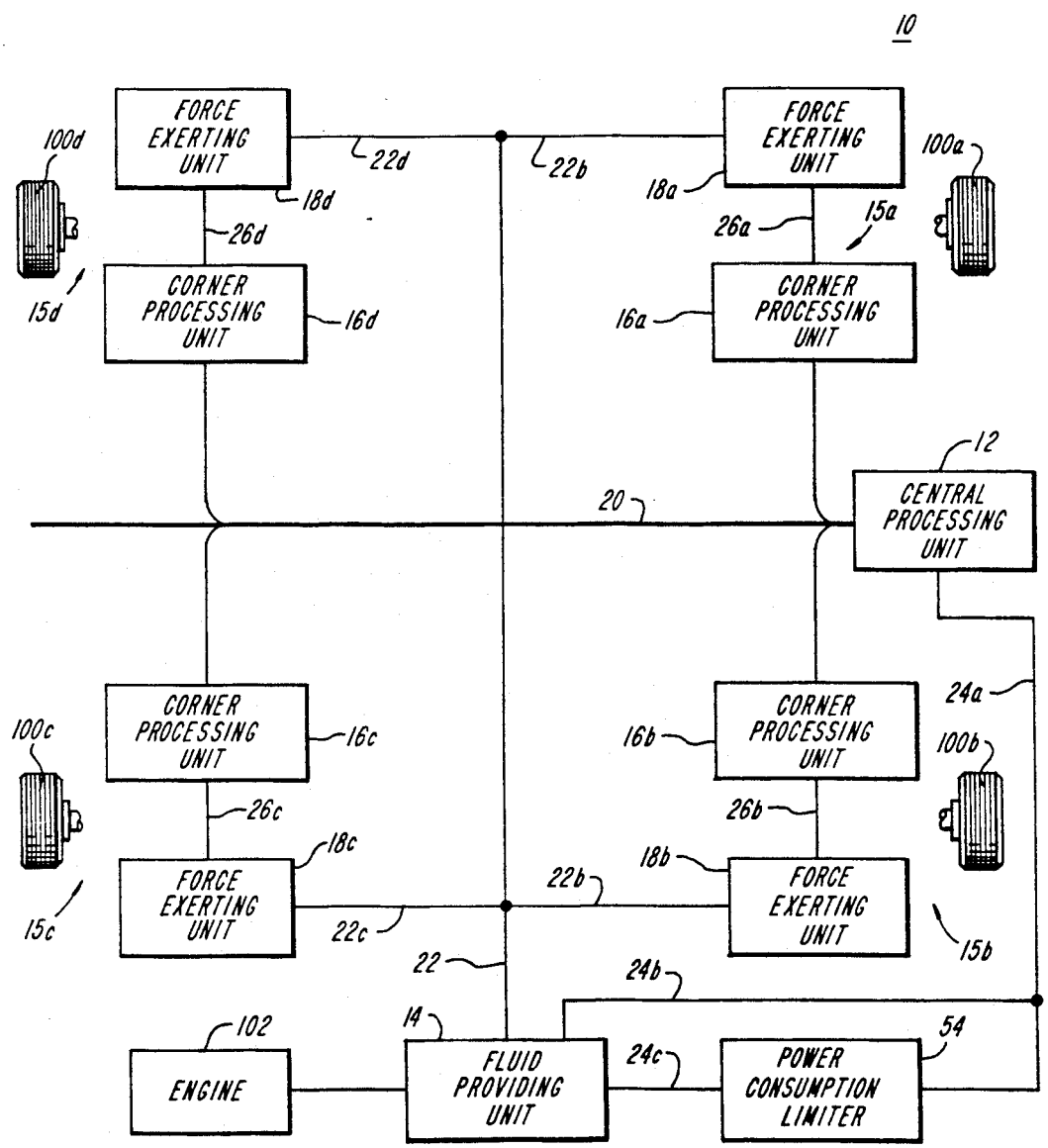
FIG. 1 is a schematic block diagram representation of an actively controlled vehicle suspension system according to a preferred embodiment of the present invention.

The schematic block diagram in FIG. 1 is an illustration of a preferred embodiment of an active suspension system 10 according to the present invention. The active suspension system 10 employs a central processing unit 12 to coordinate the overall operation of the suspension system 10, including monitoring the rate of change of power demand and/or consumption by the fluid providing unit 14. In the illustrative embodiment, the active suspension system 10 includes four suspension units 15a-d, one for each vehicle wheel 100a-d, respectively. The central processing unit 12 calculates and transmits a body force command to the suspension units 15a-d. The central processing unit 12 utilizes information from several accelerometers (not shown) and possibly other vehicle condition sensors to generate the body force command. As is well known, the body force command is the suspension response required at each suspension unit 15a-d necessary to respond to accelerations of the vehicle body relative to the vehicle wheels 100a-d.

The suspension units 15a-d include a corner processing units 16a-d, respectively, which receives the body force command for its respective suspension unit.

The corner processing units 16a-d first calculate necessary modifications to the body force commands due to local conditions such as suspension position, suspension velocity or wheel acceleration. The corner processing units 16a-d then calculate, in response to the current conditions in force exerting units 18a-d, respectively, the adjustments necessary to achieve the force and/or wheel to body velocity required to meet the modified suspension command.

The central processing unit 12 communicates with the suspension units 15a-d and, in particular, the corner processing units 16a-d, over a multi-wire bus 20. In a preferred embodiment, the multi-wire bus 20 is a 2-wire serial communication link. However, an optical communication link, or an optical or multi-wire parallel link, are acceptable alternatives.

The suspension units 15a-d further include force exerting units 18a-d, respectively. The force exerting units 18a-d respond to commands from the corner processing units 16a-d in suppressing external forces acting on the vehicle body so that it remains substantially stable in all planes of movement. The corner processing units 16a-d communicate with the force exerting units 18a-d, respectively, over multi-wires 26a-d, respectively.

The suspension units 15a-d, and particularly the force exerting units 18a-d, obtain fluid power from the fluid providing unit 14. The fluid providing unit 14 communicates with the force exerting units 18a-d via fluid conduit 22.

The central processing unit 12 also monitors the rate of change of power demand and consumption by the fluid providing unit 14 and controls the rate of change of power demand and/or consumption by the fluid providing unit 14. The actual rate of change of power demand and/or consumption by the fluid providing unit 14 is limited to an acceptable level, which is dependent upon the current vehicle conditions, including, the engine speed, the throttle position, the transmission gear position, the spark advance, and the vehicle velocity. The fluid providing unit 14 is driven by the torque provided by the engine 102 of the vehicle. The central processing unit 12 monitors the power demand and/or consumption by the fluid providing unit 14, and the rate of change thereof, in order to avoid unacceptable vehicle performance, for example, undesirable vehicle hesitation and/or surge due to an excessive rate of change of power consumption by the fluid providing unit 14.

The central processing unit 12 employs a power consumption limiter 54 to limit the power demand and/or consumption by the fluid providing unit 14 to an acceptable level. The central processing unit 12 calculates, depending upon the current vehicle conditions, the rate of change of power demand and/or consumption that is acceptable. The central processing unit 12 provides the power consumption limiter 54 with command and data signals. The power consumption limiter 54, in response, implements these commands and limits the rate of change of power demand and/or consumption by the fluid providing unit 14.

The central processing unit 12 communicates directly with the fluid providing unit 14 over multi-wires 24a and 24b. The central processing unit 12 also communicates with the power consumption limiter 54 over multi-wires 24a. The power consumption limiter 54 communicates with the fluid providing means 14 over multi-wires 24c.

Figure 2:
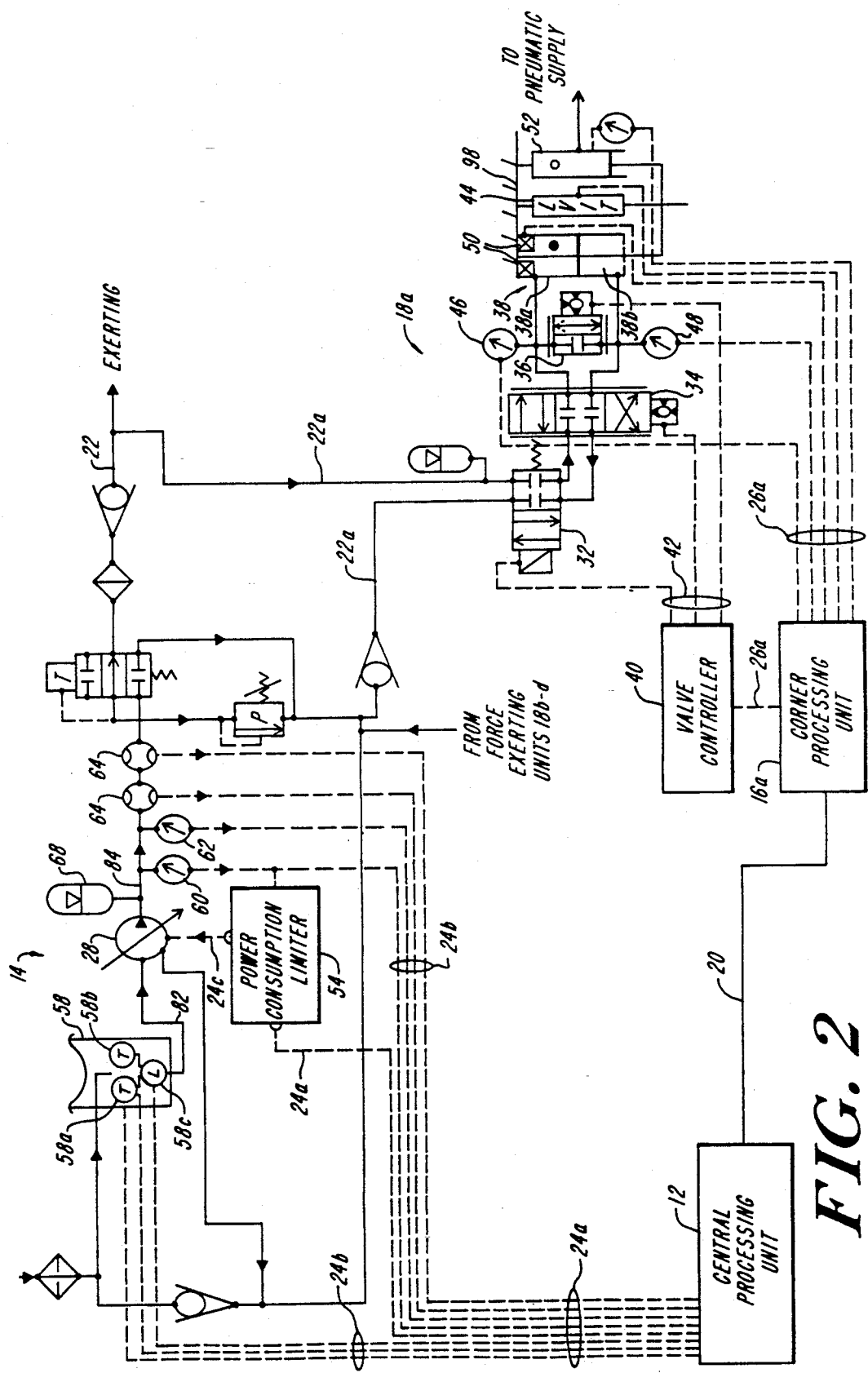
FIG. 2 is a more detailed schematic representation of an embodiment of a suspension unit of the actively controlled vehicle suspension system of FIG. 1.

In the preferred embodiment of FIGS. 1 and 2, each suspension unit 15a-d is substantially identical in function. Each suspension unit 15a-d may vary to accommodate packaging and/or space constraints. Further each suspension unit 15a-d may vary to provide a desired range of forces due to the vehicle weight distribution. FIG. 2 provides a more detailed schematic representation of one of the suspension units 15a-d, particularly suspension unit 15a, in conjunction with central processing unit 12 and fluid providing unit 14.

Referring now to FIG. 2, in a preferred embodiment the fluid providing unit 14 includes a pump 28, a reservoir 58, fluid pressure sensors 60 and 62, fluid flow sensor 64 and 66, and a noise attenuator 68. The pump 28 may be of hydraulic or pneumatic type having a fluid input port 82 and a fluid output port 84. In a preferred embodiment, the pump 28 is a variable displacement pressure compensated unidirectional type pumping mechanism. In a preferred embodiment, the active suspension system 10 employs the pump 28 to provide hydraulic fluid at a substantially constant pressure. In one preferred embodiment, the pump 28 supplies a flow rate to maintain the fluid pressure substantially constant at about 2500 psi in the fluid conduit 22.

The fluid pressure sensors 60 and 62 provide the central processing unit 12 with signals indicative of the fluid pressure of the fluid in the fluid conduit 22. The fluid flow sensors 64 and 66 provide the central processing unit 12 with signals indicative of the rate of fluid flow in the fluid conduit 22. The fluid pressure sensors 60 and 62 and the fluid flow sensors 64 and 66 communicate directly with the central processing unit 12 over multi-wires 24a and 24b.

The reservoir 58 includes temperature sensors 58a and 58b. The temperature sensors 58a and 58b provide the central processing unit 12 with signals indicative of the temperature of the fluid in the reservoir 58. The reservoir 58 also includes a fluid level sensor 58c which provides the central processing unit 12 with a signal indicative of the level of the fluid in the reservoir 58. The temperature sensors 58a and 58b and fluid level sensor 58c communicate directly with the central processing unit 12 over multi-wires 24a and 24b.

It should be noted that several of the sensors 58a, 58b, 58c, 60, 62, 64, and 66 provide somewhat redundant information, for example, fluid flow sensors 64 and 66. Having redundant sensor is not necessary to the proper operation of the system 10.

In a preferred embodiment, force exerting unit 18a includes a protection valve 32, a power valve 34, a by-pass valve 36, and a cylinder 38 having a first chamber 38a and a second chamber 38b. The protection valve 32 is a 4-port electronically controlled, normally closed valve. It is well known that this means that there is no fluid communication through the valve unless it is actuated. The protection valve 32 is a two state device and, in its actuated state, provides fluid communication between the fluid providing unit 14 and the remaining elements of the force exerting unit 18a.

The power valve 34 is a 4-port electronically controlled, continuously adjustable, servo valve. The power valve 34 provides fluid communication between the cylinder 38 and the fluid providing unit 14.

The by-pass valve 36 is a 2-port electronically controlled, continuously adjustable, servo valve. The by-pass valve 36 provides fluid communication through the valve between the chamber 38a and 38b of the cylinder 38 in the default or normal state.

The force exerting unit 18a also includes a valve controller 40. The valve controller 40 functions as an interface between the corner processing unit 16a and the force exerting unit 18a. The corner processing unit 16a provides valve control signals to the valve controller 40 which, in turn, controls the position or states of the valves 32, 34 and 36. The corner processing unit 16a communicates with the valve controller 40 over multi-wires 26a. The protection valve 32, power valve 34, and by-pass valve 36 are all responsive to signals from the valve controller 40. The valve controller 40 communicates with the valves 32, 34, and 36 over multi-wires 42.

It should be noted that the function of the valve controller 40 may be fully incorporated within the corner processing unit 16a. Under those conditions, the corner processing unit 16a does not require a controller to interface with the valves 32, 34, and 36.

The force exerting unit 18a further includes position transducer 44, pressure sensors 46 and 48, load cell 50, and a single acting pneumatic actuator 52. The position transducer 44 provides information which is indicative of the instantaneous position of the piston in the cylinder 38. In a preferred embodiment, the position transducer 44 is a linear variable inductor transducer. The corner processing unit 16a communicates with the position transducer 44 over multi-wires 26a.

Figure 3A:
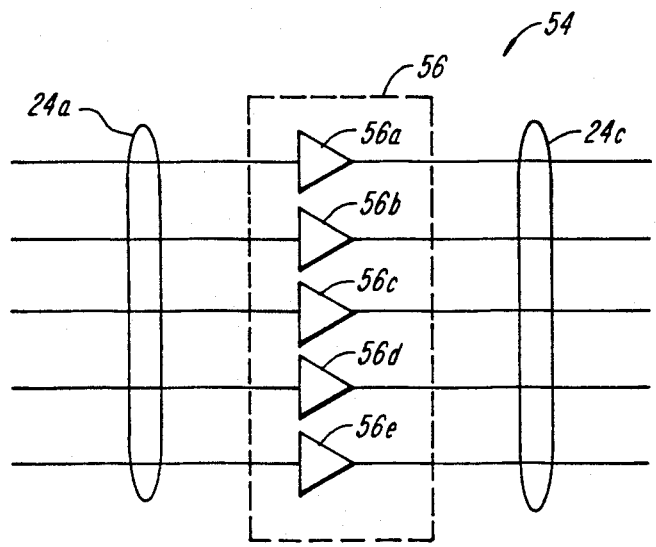
FIGS. 3A and 3B are schematic block diagrams of preferred embodiments of the power consumption limiter of the fluid providing unit of the actively controlled vehicle suspension system of FIG. 1.

With reference to FIG. 3A, in one preferred embodiment the power consumption limiter 54 includes a bank of line drivers 56a-e. The line drivers 56a-e provide an electrical interface between the central processing unit 12 and the fluid providing unit 14. The line drivers 56a-e facilitate direct communication between the central processing unit 12 and the fluid providing unit 14. The commands sent by the central processing unit 12 are electrically adjusted by the line drivers 56a-e to allow the central processing unit 12 to directly manipulate the operating characteristics of the fluid providing unit 14 and particularly its rate of change of power demand and/or consumption.

Figure 3B:
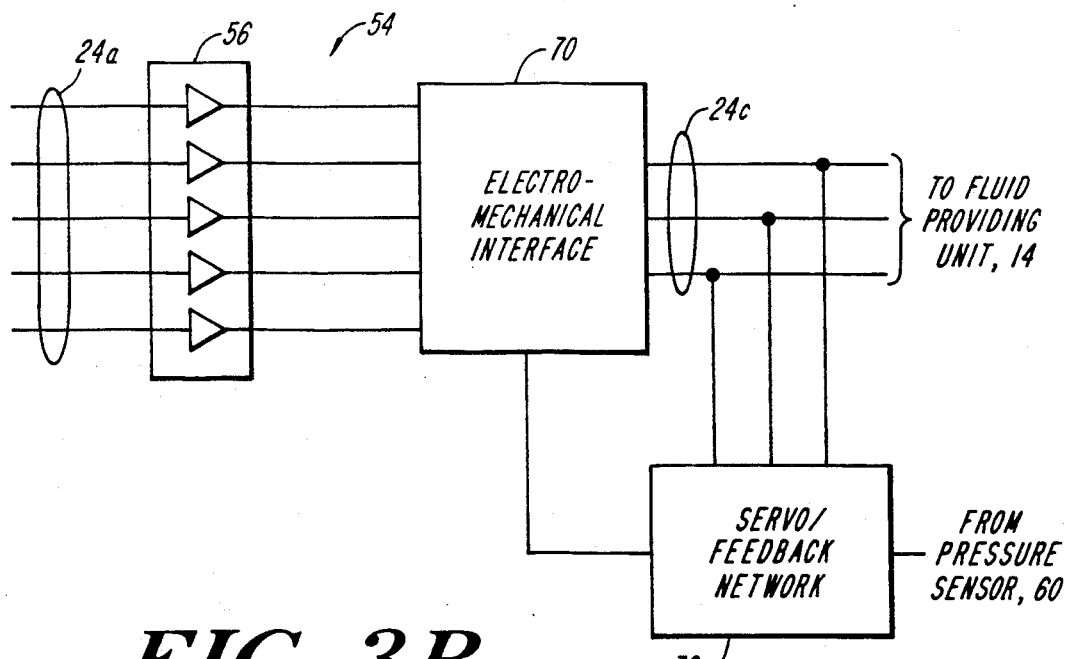

FIG. 3B illustrates another preferred embodiment of the power consumption limiter 54. Here, the power consumption limiter 54 includes the line drivers 56a-e as illustrated in FIG. 3A and also an electro-mechanical interface 70 and servo/feedback network 72. The electro-mechanical interface 70 facilitates communication between the central processing unit 12 and the fluid providing unit 14 in situations where the fluid providing unit 12 includes a pumping control mechanism that is unable to communicate directly with the central processing unit 12. The electro-mechanical interface 70 and the servo/feedback network 72 continually monitor the response of the fluid providing unit 14 to control signals that limits its power consumption. The feedback network 72 provides the electro-mechanical interface 70 with signals that permit the interface 70 to adjust its commands to more accurately control the rate of change of power demand and/or consumption by the fluid providing unit 12.

In a preferred embodiment, the fluid providing unit 14 utilizes a pressure compensated variable flow type pump 28, for example, an axial piston pumping mechanism or a radial piston pumping mechanism. A pressure compensated type pump is a pumping mechanism that is responsive to the pressure of the fluid at the outlet of the pump 28. When the fluid pressure at the outlet is less than a predetermined value, then the flow of fluid is increased. Alternatively, when the pressure of the fluid at the pump's outlet is greater than a predetermined value, then the flow of fluid is decreased.

Figure 4A:
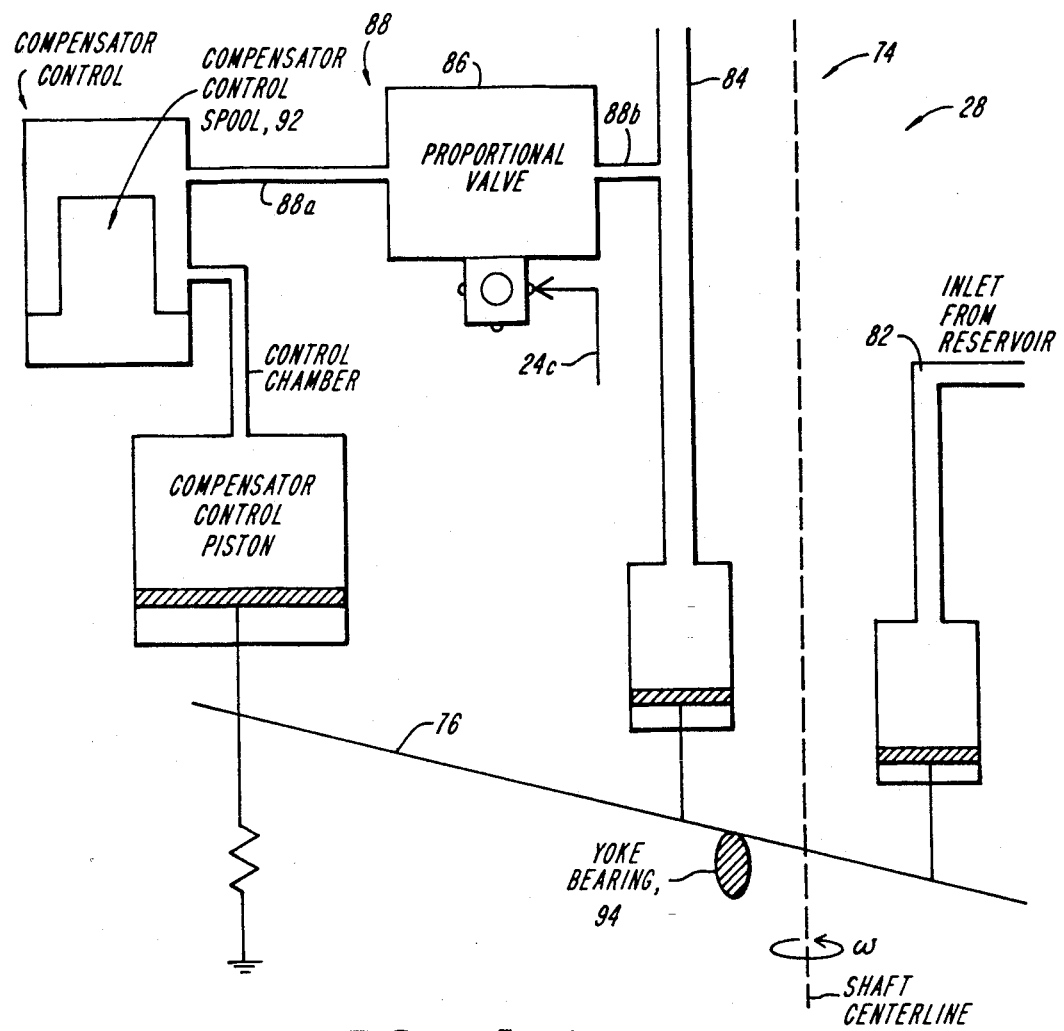
FIGS. 4A and 4B are schematic representations of preferred embodiments of the variable displacement unidirectional pump of the fluid providing unit of the actively controlled vehicle suspension system of FIG. 2.

With reference to FIG. 4A, the pump 28, in one preferred embodiment, may be an axial piston pumping mechanism 74, for example a model "TV" manufactured by Vickers Corporation of Troy, Mich. The rate of change of power consumption by the axial piston pumping mechanism 74 is controlled by manipulating the attitude of the swash plate 76. The rate of change of the power consumption is determined by the rate of change of the attitude of the swash plate 76. It should be noted that the rate of response of the axial piston pumping mechanism 74 to a change of pressure in its discharge chamber 84 is dependent upon the flow resistance of the sensing passage 88, the mass of the valve spool of the compensator control valve 92, the fluid damping of the valve spool of the compensator control 92, the moment of inertia of the swash plate 76 about the yoke bearing 94 and the fluid damping of the swash plate 76. The rate of change of the power demand and consumption may be controlled by manipulating any one or all or any combination of these variables or dependencies.

In a preferred embodiment, the rate of response of the axial piston pumping mechanism 74 is controlled by adjusting the flow resistance in the sensing passage 88. A proportional valve 86 is incorporated within the sensing passage 88 between the compensator control valve spool 92 and the fluid output port 84. The proportional valve 86 is incorporated within the sensing passage 88 thereby dividing the sensing passage 88 into passages 88a and 88b. The rate of change of the attitude of the swash plate 76 is adjusted by regulating the aperture of the proportional valve 86. The central processing unit 12 may be coupled to the pump 28 and, in particular, the proportional valve 86, through line drivers 56 and multi-wires 24c to control and regulate the rate of change of the power demand and/or consumption by the pump 28.

As indicated above, in some applications it may be necessary or advantageous to employ the electro-mechanical interface 70 and servo/feedback network 72 of the power consumption limiter 54 to facilitate interfacing with and controlling the rate of change of displacement of the attitude of the swash plate 76 of the axial piston pumping mechanism 74.

Figure 4B:
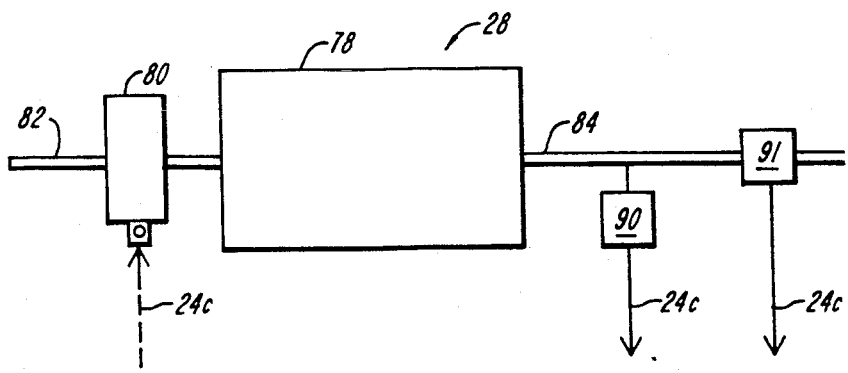

With reference to FIG. 4B, in another preferred embodiment, the pump 28 may be an electronically controllable radial piston pumping mechanism 78, for example, model ZF-8604-988-130 manufactured by Zahnradfadrik Friedrichshafen ("ZF"), of Germany. The rate of change of power demand and/or consumption by a radial piston pumping mechanism 78 is controlled by adjusting the flow resistance of an inlet valve 80 of the radial piston pumping mechanism 78. The pressure of the fluid measured at the pump fluid output conduit 84 by a pressure sensor 90 is used by the pump's resident electronics to control the orifice diameter of, or the amount of fluid flow resistance introduced by, the inlet valve 80.

In a preferred embodiment, the central processing unit 12 receives information indicative of fluid pressure and flow at the pump fluid output conduit 84 from the pressure sensor 90 and flow sensor 91, respectively, and manipulates this data to adjust the response rate of the radial piston pumping mechanism 78. The central processing unit 12 controls the rate of change of power consumption by the radial piston pumping mechanism 78 by adjusting the flow resistance at the inlet valve 80 of the radial piston pumping mechanism 78.

The central processing unit 12 may couple to the radial piston pumping mechanism 78 and, in particular, to inlet valve 80, pressure sensor 90, and flow sensor 91 through line drivers 56 and multiwires 24c to control and regulate the power consumption by the radial piston pumping mechanism 78. Again, in some applications it may be necessary or advantageous to employ the electro-mechanical interface 70 and servo/feedback network 72 of power consumption limiter 54 to facilitate interfacing with and controlling the inlet valve 80 of the radial piston pumping mechanism 78. The central processing unit 12 then controls the power demand and/or consumption by the radial piston pumping mechanism 78, through the electro-mechanical interface 70 and servo/feedback network 72, by regulating the orifice of the inlet valve 80 of the radial piston pumping mechanism 78.

In operation, the system 10 is designed such that the fluid providing unit 14 provides fluid to the force exerting units 16a–d at a substantially constant pressure. The rate of change of power demand and consumption by the pump 28 is limited to a predetermined level, which is dependent upon the current vehicle conditions, including, the engine speed, the throttle position, the transmission gear position, the spark advance, and the vehicle velocity. Since the pump 28 is driven by the torque of the engine 102, the pump's power demand and/or consumption and the rate of change thereof, are monitored and controlled by central processing unit 12 in order to avoid undesirable vehicle performance, for example, hesitation and/or surge due to an excessive rate of change of power consumption by the pump 28.

In one embodiment, the central processing unit 12 calculates the rate of change of the power demand and consumption by the pump 28 directly from the power demand and consumption by the pump 28. The power consumption by the pump 28 is calculated by the central processing unit 12 from the information provided by the sensors 60, 62, 64 and 66. The rate of change of power demand and consumption by the pump 28 ($R_p$) is equal to the magnitude of the useful power being delivered by the pump 28 divided by the efficiency of the pump 28 and may be expressed as:

$$R_p = d\{[P*Q/v(P,T,S)]\}/dt;$$

where:
P = outlet pressure of the pump;
Q = outlet volume flow rate;
v = efficiency of the pump;
T = inlet fluid temperature of the pump; and
S = rotational speed of the pump—(the rotational speed of the pump may be estimated from the engine speed).

Although not indicated as such, it should be noted that these variables are time varying.

In view of this document, it will be readily appreciated by those skilled in the art that there exist several other methods of calculating the power consumption by the pump 28 and the rate of change of the power demand and/or consumption by the pump 28, for example, by employing various types of power sensors on the pump 28.

In another embodiment, the central processing unit 12 calculates the rate of change of the power demand and/or consumption by time averaging the sum of the current power consumption by the suspension units 15a–d (the power consumed by the suspension units 15a–d in responding to the current body force command). The central processing unit 12 transmits the suspension response to each corner processing unit 16a–d. Each corner processing unit 16a–d first calculates necessary modifications to the body force commands due to local conditions such as suspension position, suspension velocity or wheel acceleration. The corner processing units 16a–d then calculate, in response to the current pressure conditions measured by the load cell 50 and the current relative displacement of the wheels 100a–d from the vehicle body 98 measured by the position transducer 44, the adjustments necessary to meet the modified suspension command demanded by the central processing unit 12.

The corner processing units 16a–d then compute the fluid power consumed by the force exerting unit 18a–d, respectively, in making these adjustments. The corner processing units 16a–d calculate the power consumption by the suspension unit 15a–d, respectively, from the product of the pressure of the fluid in fluid conduit 22 and the current flow rate of the fluid (the flow of the fluid required for that force exerting unit 16a–d to respond to the body force command) in the force exerting units 18a–d. The corner processing units 16a–d report to the central processing unit 12 the power consumption by the suspension units 15a–d.

The central processing unit 12, having data representative of the power consumption by all of the suspension units 15a–d, then calculates the total power consumed by all of the suspension units 15a–d. The central processing unit 12 calculates the rate of change of the power demand and/or consumption by the pump 28 from the sum of the current power consumption by the suspension units 15a–d (the power consumed by the suspension units 15a–d in responding to the current body force command) divided by the efficiency of the pump 28. The efficiency of the pump 28 may be expressed, as detailed above, as a function of temperature, rotational speed, and pressure.

In this embodiment, the rate of change of power consumption of the pump 28 may be expressed as:

$$R_p = \Sigma_i d \lvert [P^*V_i^*A_i/v(P,T,S)] \rvert / dt;$$

where:
- i = the number of force exerting units 18;
- P = outlet pressure of the pump;
- $A_i$ = the area of the $i^{th}$ piston;
- $V_i$ = the $i^{th}$ wheel 100a–d to body 98 velocity;
- v = efficiency of the pump;
- T = inlet fluid temperature of the pump; and
- S = rotational speed of the pump—(the rotational speed of the pump may be estimated from the engine speed).

Although not indicated as such, it should be noted that these variables are time varying.

As mentioned above, if the rate of change is greater than an acceptable level depending upon the aforementioned current conditions of vehicle 30, then the power consumption limiter 54, engaged by the central processing unit 12, prevents a change in the power demand and consumption by the pump 28 from exceeding the acceptable level.

The predetermined level for the rate of change of power consumption by pump 28 may be calculated by the central processing unit 12. The acceptable level of power demand and consumption by the fluid providing unit 14 varies depending upon the momentary ability of the vehicle engine to change the rate at which it can deliver power. The power consumption by the fluid providing unit 14 is limited to an acceptable predetermined level which is dependent upon the current vehicle conditions, including the engine speed, the throttle position, the transmission gear position, the spark advance and the vehicle velocity. The central processing unit 12 acquires data representative of the current vehicle conditions from the appropriate sensors (not shown).

When the suspension system 10 employs an axial piston pumping mechanism 74, the central processing unit 12 may control the rate of change of power demand and consumption by the pump 28 by manipulating any of the dependencies of the response time of the pumping mechanism 74. In one preferred embodiment, the central processing unit 12 controls the fluid flow resistance of the proportional valve 86. The central processing unit 12 may regulate the rate of change of the power demand and consumption by the pump 28 to the predetermined value based upon the following relationship:

$$r_f - r_o = g^*(R_o/R_e);$$

where:
- $r_o$ = the flow resistance of a fully open proportional valve 86;
- $r_f$ = the flow resistance of proportional valve 86;
- $R_o$ = the maximum rate at which power consumption of the pump 28 can change when valve 86 is fully open;
- $R_e$ = the maximum momentary rate at which the engine 102 can change the power it is delivering to the pump 28;
- $g^*(R_o/R_e) =$
  0, if $R_e \geq R_o$
  $[g^*(R_o/R_e) - 1]$, if $0 \leq R_e \leq R_o$; and
- g = an adjustable gain.

In another preferred embodiment, when the suspension system 10 employs the radial piston pumping mechanism 78, central processing unit 12 may regulate the rate of change of the power demand and consumption by the pump 28 to the predetermined value by first filtering the time varying maximum rate at which the engine 102 can change the power that it is delivering to the pump 28 through a low pass filter with a bandwidth B, and then employing the following relationship:

$$B = B_o^* g^*(R_p - R_e);$$

where:
- $B_o$ = the reference bandwidth which corresponds to the rise time of the pump 28 when the inlet valve 80 is fully open;
- $R_p$ = the rate of change of power demand and consumption by the pump 28;
- $R_e$ = the maximum momentary rate at which the engine 102 can change the power it is delivering to the pump 28;
- $g^*(R_o/R_e) =$
  0, if $R_e \geq R_o$
  $[g^*(R_o/R_e) - 1]$, if $0 \leq R_e \leq R_o$; and
- g = an adjustable gain.

In those instances in which the restriction to the rate of change of power demand and/or consumption by the pump 28 prevents the pump 28 from providing the fluid power required by the suspension system 10, then the overall suspension system 10 will not perform entirely as originally demanded or anticipated by the central processing unit 12 and corner processing units 16a–d. Under these circumstances, the pump 28 will be unable to provide a substantially constant fluid pressure in fluid conduit 22.

Various preferred embodiments of the present invention have been described. It is understood, however, that changes and modifications can be made without departing from the true scope and spirit of the present invention as defined by the following claims, which are to be interpreted in view of the foregoing.

What is claimed is:

1. An active suspension system for a vehicle having sprung and unsprung masses, comprising:

fluid providing means for providing a pressurized fluid;

processing means, coupled to said fluid providing means, for calculating the rate of change of power consumption by said fluid providing means and for controlling the rate of change of power consumption by said fluid providing means when said rate of change of power consumption by said fluid providing means exceeds a predetermined value;

force exerting means operative in response to said pressurized fluid, to generate forces between said sprung and unsprung masses; and wherein said processing means further includes means for calculating power consumption by said force exerting means and wherein said rate of change of power consumption by said fluid providing means is calculated from said power consumption by said force exerting means.

2. The active suspension system of claim 1 wherein said power consumption by said force exerting means is calculated from at least the product of flow rate of said fluid in said force exerting means and pressure of said fluid provided by said fluid providing means.

3. The active suspension system of claim 1 wherein said force exerting means includes at least two force exerting units, each disposed at a vehicle wheel, and wherein said processing means includes at least two corner processing units each coupled to a corresponding one of said force exerting units for calculating power consumption by said force exerting units.

4. The active suspension system of claim 3 wherein each of said corner processing unit calculates power consumption by its corresponding force exerting unit by at least multiplying flow rate of said fluid in said corresponding force exerting unit by pressure of said fluid provided by said fluid providing means and wherein said processing means calculates said rate of change of power consumption by said fluid providing means by summing said power consumption calculated by each of said corner processing units.

5. The active suspension system of claim 4 wherein each said force exerting units includes:
a cylinder disposed between said sprung and unsprung masses, having a pressure chamber adapted to receive said fluid, and
fluid pressure actuator means, fluidicly coupled to said fluid providing means and said cylinder, for controlling rate of flow of said fluid within said pressure chamber to generate variable forces.

6. The active suspension system of claim 1 wherein said fluid providing means includes a fluid pump for providing said pressurized fluid and wherein said processing means controls said rate of change of power consumption by said pump when said rate of change of power consumption by said pump exceeds said predetermined value, said fluid pump being an axial piston pump having a sensing passage and said rate of change of power consumption by said axial piston pump is controlled by increasing or decreasing fluid resistance in said sensing passage.

7. The active suspension system of claim 1 wherein said fluid providing means includes a fluid pump for providing said pressurized fluid and wherein said processing means controls said rate of change of power consumption by said pump when said rate of change of power consumption by said pump exceeds said predetermined value, said fluid pump being a radial piston pump having an inlet and said rate of change of power consumption by said radial piston pump is controlled by increasing or decreasing fluid resistance at said inlet of said radial piston pump.

8. The active suspension system of claim 1 wherein said processing means further includes means for calculating power consumption by said fluid providing means wherein said rate of change of power consumption by said fluid providing means is calculated from at least said power consumption by said fluid providing means, and wherein said processing means calculates power consumption by said fluid providing means from at least the product of flow rate of said fluid provided by said fluid providing means and pressure of said fluid provided by said fluid providing means.

9. The active suspension system of claim 1 wherein said processing means further includes means for calculating power consumption by said fluid providing means wherein said rate of change of power consumption by said fluid providing means is calculated from at least said power consumption by said fluid providing means, and wherein, said fluid providing means includes a fluid pump for providing said pressurized fluid and wherein said processing means controls said rate of change of power consumption by said pump when said rate of change of power consumption by said pump exceeds said predetermined value, and wherein, said fluid pump is an axial piston pump having a sensing passage and said rate of change of power consumption by said axial piston pump is controlled by increasing or decreasing fluid resistance in said sensing passage.

10. The active suspension system of claim 1 wherein said processing means further includes means for calculating power consumption by said fluid providing means wherein said rate of change of power consumption by said fluid providing means is calculated from at least said power consumption by said fluid providing means, and wherein, said fluid providing means includes a fluid pump for providing said pressurized fluid and wherein said processing means controls said rate of change of power consumption by said pump when said rate of change of power consumption by said pump exceeds said predetermined value, and wherein, said fluid pump is a radial piston pump having an inlet and said rate of change of power consumption by said radial piston pump is controlled by increasing or decreasing fluid resistance at said inlet of said radial piston pump.

11. An active suspension system for a vehicle having sprung and unsprung masses, comprising:

fluid providing means for providing a pressurized fluid;

processing means, comprising means for calculating power demand of said fluid providing means, coupled to said fluid providing means, for calculating rate of change of power demand by said fluid providing means and for controlling rate of the change of the power demand by said fluid providing means when said rate of change of the power demand by said fluid providing means exceeds a predetermined value, said rate of change of power demand of said fluid providing means being calculated from at least said power demand of said fluid providing means from at least the product of flow rate of said fluid provided by said fluid providing means and pressure of said fluid provided by said fluid providing means.

12. The active suspension system of claim 11 wherein said fluid providing means includes a fluid pump for providing said pressurized fluid and wherein said processing means controls said rate of change of power demand of said pump when said rate of change of the power demand of said pump exceeds said predetermined value, said fluid pump being an axial piston pump having a sensing passage and said rate of change of power demand of said axial piston pump is controlled by increasing or decreasing fluid resistance in said sensing passage.

13. The active suspension system of claim 11 wherein said fluid providing means includes a fluid pump for providing said pressurized fluid and wherein said processing means controls said rate of change of power demand of said pump when said rate of change of the power demand of said pump exceeds said predetermined value, said fluid pump being a radial piston pump having an inlet and said rate of change of power demand of said radial piston pump is controlled by increasing or decreasing the fluid resistance at said inlet of said radial piston pump.

14. An active suspension system comprising:
fluid providing means having a fluid output port for providing a pressurized fluid;
force exerting means for generating variable forces, including,
  a cylinder, being disposed between a vehicle body and a vehicle wheel, having a pressure chamber adapted to receive said fluid, and
  a force exerting unit, fluidicly coupled to said fluid output port and said cylinder, for varying the pressure of said fluid within said pressure chamber to generate variable forces; and
a processing unit, electrically coupled to said fluid providing means and said force exerting means, said processing unit comprising, in combination,
  power consumption limiting means, coupled to said fluid providing means, for controlling rate of change of power consumption by said fluid providing means when rate of change of power consumption by said fluid providing means exceeds a predetermined value, and
  power consumption computing means for computing the power consumption by said fluid providing means and wherein the rate of change of power consumption by said fluid providing means is calculated from at least the power consumption by said force exerting unit.

15. The active suspension system of claim 14 further including sensor means, coupled to said fluid providing means, for generating signals indicative of output pressure and flow of said fluid providing means, and wherein said rate of change of said power consumption by said fluid providing means is calculated from at least the power consumption by said fluid providing means.

16. The active suspension system of claim 15 wherein said fluid sensor means is further coupled to said power consumption computing means and wherein said power consumption computing means computes the power consumption by said fluid providing means from at least said signals indicative of the output pressure and flow of said fluid providing means.

17. The active suspension system of claim 15 wherein said fluid providing means includes a fluid pump for providing said pressurized fluid and wherein said processing means controls said rate of change of power consumption by said pump when said rate of change of power consumption by said pump exceeds said predetermined value, said fluid pump being an axial piston pump having a sensing passage and said rate of change of power consumption by said axial piston pump is controlled by increasing or decreasing fluid resistance in said sensing passage.

18. The active suspension system of claim 15 wherein said fluid providing means includes a fluid pump for providing said pressurized fluid and wherein said processing means control said rate of change of power consumption by said pump when said rate of change of power consumption by said pump exceeds said predetermined value, said fluid pump being a radial piston pump having an inlet and said rate of change of power consumption by said radial piston pump is controlled by increasing or decreasing fluid resistance at said inlet of said radial piston pump.

* * * * *